United States Patent
Mizobata et al.

(10) Patent No.: US 8,297,708 B2
(45) Date of Patent: Oct. 30, 2012

(54) ASSEMBLING STRUCTURE OF PLANAR ELASTIC BODY OF VEHICLE SEAT

(75) Inventors: Hiroshi Mizobata, Seto (JP); Hideyuki Abe, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 401 days.

(21) Appl. No.: 12/755,455

(22) Filed: Apr. 7, 2010

(65) Prior Publication Data

US 2010/0259089 A1    Oct. 14, 2010

(30) Foreign Application Priority Data

Apr. 9, 2009   (JP) ................. 2009-094550

(51) Int. Cl.
  *A47C 7/02* (2006.01)
(52) U.S. Cl. ......... 297/452.56; 297/230.11; 297/452.13; 297/452.12; 297/440.11; 297/440.2
(58) Field of Classification Search ............ 297/230.11, 297/230.13, 452.13, 452.12, 440.11, 440.2, 297/440.22, 452.56
See application file for complete search history.

(56) References Cited

U.S. PATENT DOCUMENTS

| | | | |
|---|---|---|---|
| 3,024,068 A * | 3/1962 | Eames ................ | 297/452.13 |
| 3,870,366 A * | 3/1975 | Rogers ............... | 297/440.23 |
| 5,507,563 A * | 4/1996 | Arthur, Jr. ........... | 297/440.23 |
| 5,765,804 A | 6/1998 | Stumpf et al. | |
| 5,772,282 A | 6/1998 | Stumpf et al. | |
| 5,826,938 A | 10/1998 | Yanase et al. | |
| 6,035,901 A | 3/2000 | Stumpf et al. | |
| 6,059,368 A | 5/2000 | Stumpf et al. | |
| 6,125,521 A | 10/2000 | Stumpf et al. | |
| 6,152,534 A | 11/2000 | Maeda et al. | |
| 6,231,125 B1 * | 5/2001 | Maeda et al. ......... | 297/452.56 |
| 6,257,665 B1 * | 7/2001 | Nagamitsu et al. .... | 297/285 |
| 6,375,269 B1 | 4/2002 | Maeda et al. | |
| 6,386,634 B1 | 5/2002 | Stumpf et al. | |
| 6,406,093 B1 * | 6/2002 | Miotto et al. ......... | 297/218.5 |
| 6,489,000 B1 | 12/2002 | Ogura et al. | |
| 6,588,842 B2 | 7/2003 | Stumpf et al. | |
| 6,702,390 B2 | 3/2004 | Stumpf et al. | |
| 6,722,741 B2 | 4/2004 | Stumpf et al. | |
| 6,726,286 B2 | 4/2004 | Sayers et al. | |

(Continued)

FOREIGN PATENT DOCUMENTS

JP   9-104316   4/1997

(Continued)

*Primary Examiner* — Laurie Cranmer
(74) *Attorney, Agent, or Firm* — Greenblum & Bernstein, P.L.C.

(57) ABSTRACT

An assembling structure for a vehicle seat includes: an assembly frame having a frame shape and configured to be detachably attached to a seat main body of the vehicle seat, the seat main body having a backbone frame having a frame shape; a planar elastic body configured to elastically support a body of an occupant and is stretched on the assembly frame; an elastic latching unit configured to be detachably attached to a part of the backbone frame, the elastic latching unit formed on a part of a periphery of the assembly frame, wherein the assembly frame further includes a hook portion, the backbone frame further includes a portion to be hooked, and the planar elastic body is prevented from moving in an out-of-plane direction of the planar elastic body when the hook portion of the assembly frame is hooked on the portion to be hooked of the backbone frame.

6 Claims, 6 Drawing Sheets

U.S. PATENT DOCUMENTS

| | | |
|---|---|---|
| 6,733,080 B2 | 5/2004 | Sayers et al. |
| 6,942,300 B2 * | 9/2005 | Numa et al. ............. 297/452.56 |
| 6,966,604 B2 | 11/2005 | Stumpf et al. |
| 7,568,765 B2 * | 8/2009 | Brauning ................... 297/354.1 |
| 7,594,700 B2 | 9/2009 | Stumpf et al. |
| 8,172,332 B2 * | 5/2012 | Masunaga et al. ....... 297/452.15 |
| 2001/0028188 A1 | 10/2001 | Stumpf et al. |
| 2001/0030453 A1 | 10/2001 | Stumpf et al. |
| 2004/0155503 A1 | 8/2004 | Stumpf et al. |
| 2005/0064149 A1 | 3/2005 | Iseki et al. |
| 2008/0284229 A1 | 11/2008 | Masunaga et al. |

FOREIGN PATENT DOCUMENTS

| | | |
|---|---|---|
| JP | 9-276089 | 10/1997 |
| JP | 10-327972 | 12/1998 |
| JP | 11-151134 | 6/1999 |
| JP | 11-192136 | 7/1999 |
| JP | 11-192138 | 7/1999 |
| JP | 11-266959 | 10/1999 |
| JP | 11-266961 | 10/1999 |
| JP | 11-309048 | 11/1999 |
| JP | 11-342037 | 12/1999 |
| JP | 11-342038 | 12/1999 |
| JP | 11-342039 | 12/1999 |
| JP | 2000-125978 | 5/2000 |
| JP | 2000-262359 | 9/2000 |
| JP | 2001-137065 | 5/2001 |
| JP | 2002-102557 | 4/2002 |
| JP | 2002-253881 | 9/2002 |
| JP | 2004-090521 | 3/2004 |
| JP | 2004-105771 | 4/2004 |
| JP | 2004-121869 | 4/2004 |
| JP | 2004-141677 | 5/2004 |
| JP | 2004-147897 | 5/2004 |
| JP | 2005-160558 | 6/2005 |
| JP | 2006-110000 | 4/2006 |
| JP | 2006-110001 | 4/2006 |
| JP | 2006-122079 | 5/2006 |
| JP | 2007-117564 | 5/2007 |
| JP | 2008-073556 | 4/2008 |
| JP | 2008-302062 | 12/2008 |
| JP | 2008-302082 | 12/2008 |
| JP | 2009-172091 | 8/2009 |

* cited by examiner

ASSEMBLING STRUCTURE OF PLANAR ELASTIC BODY OF VEHICLE SEAT

CROSS REFERENCE TO RELATED APPLICATION

The present application claims priority from Japanese Patent Application No. 2009-094550, which was filed on Apr. 9, 2009, the disclosure of which is herein incorporated by reference in its entirety.

TECHNICAL FIELD

The apparatuses and devices consistent with the present invention relate to an assembling structure of a planar elastic body of a vehicle seat. More specifically, the present invention relates to an assembling structure of a planar elastic body of a vehicle seat for detachably assembling the planar elastic body which elastically supports the body of a seated occupant to a seat main body.

BACKGROUND

There is a related art net seat in which a planar net material (a planar elastic body) that is a cushion body stretches on a frame body constituting a backbone of a seat main body. As an example, Patent Document 1 discloses a net seat in which the net material is provided detachably to the seat main body. According to the net seat disclosed in Patent Document 1, its attaching and/or detaching operation is simple. In this disclosure, the net material is configured by being assembled to an assembly frame in advance, and the net material is attached to or removed from the seat main body by attaching the assembly frame to the seat main body or removing it from the seat main body.

Patent Document 1: JP-A-2008-73556

SUMMARY

However, in the above described related art, the assembly frame is configured such that the entire periphery thereof is bonded to the seat main body by a hook-loop type fastener such as a magic tape (a registered trademark) and an operation to remove the assembly frame from the seat main body is troublesome.

The present invention has been made in order to solve the above-described problem. An object of the invention is to make an assembly frame, on which a planar elastic body elastically supporting the body of the seated occupant stretches, be attached to or detached from the seat main body simply.

According to an illustrative aspect of the present invention, there is provided an assembling structure for a vehicle seat, comprising: an assembly frame that has a frame shape and configured to be detachably attached to a seat main body of the vehicle seat, the seat main body having a backbone frame that has a frame shape; a planar elastic body that is configured to elastically support a body of an occupant and is stretched on the assembly frame; an elastic latching unit that is configured to be detachably attached to a part of the backbone frame such that the assembly frame is detachably attached to the seat main body, the elastic latching unit formed on a part of a periphery of the assembly frame, wherein the assembly frame further includes a hook portion, the backbone frame further includes a portion to be hooked, and wherein the planar elastic body is prevented from moving in an out-of-plane direction of the planar elastic body when the hook portion of the assembly frame is hooked on the portion to be hooked of the backbone frame.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Hereinafter, a description for carrying out an exemplary embodiment of the invention will be given with reference to the accompanying drawings.

First Embodiment

Figure 1:
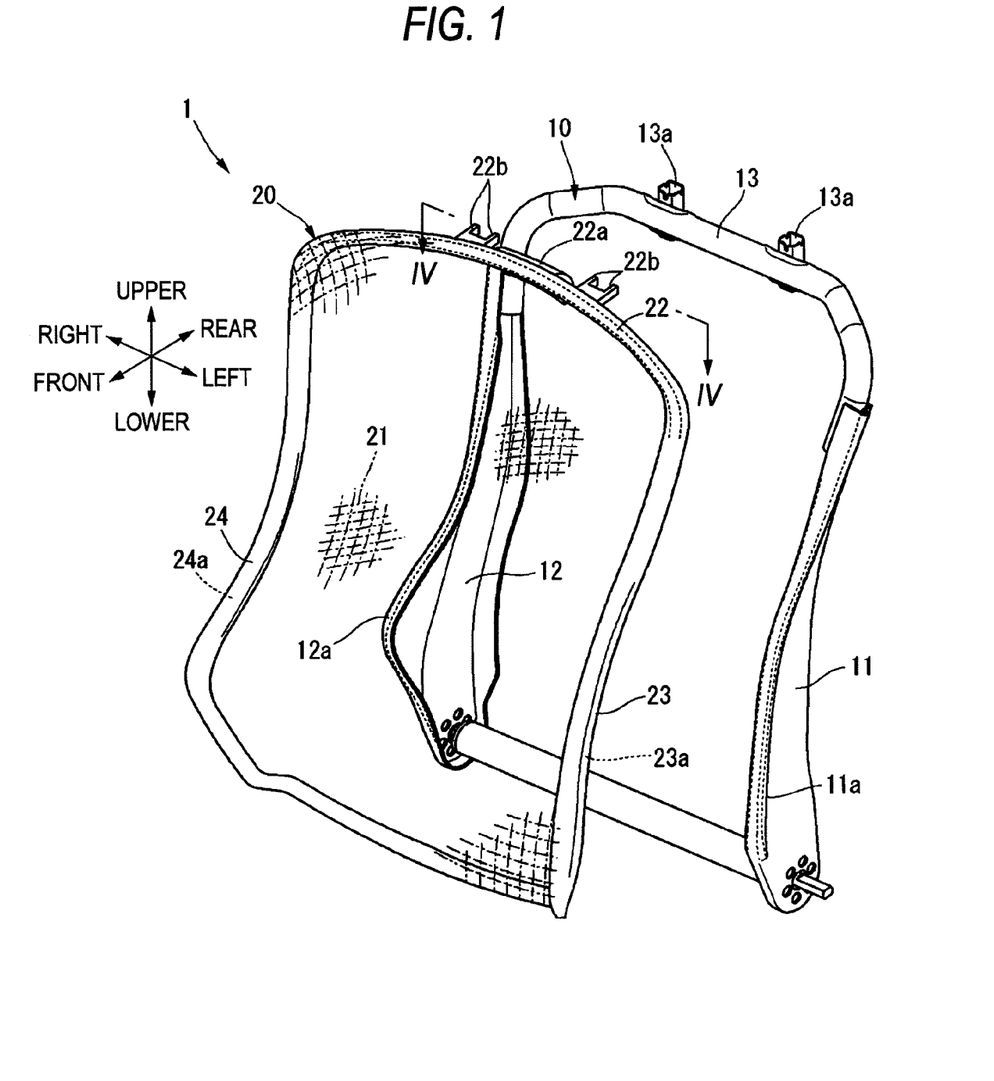
FIG. 1 is an exploded perspective view of a seat back of the vehicle seat according to first exemplary embodiment of the invention.
Figure 2:
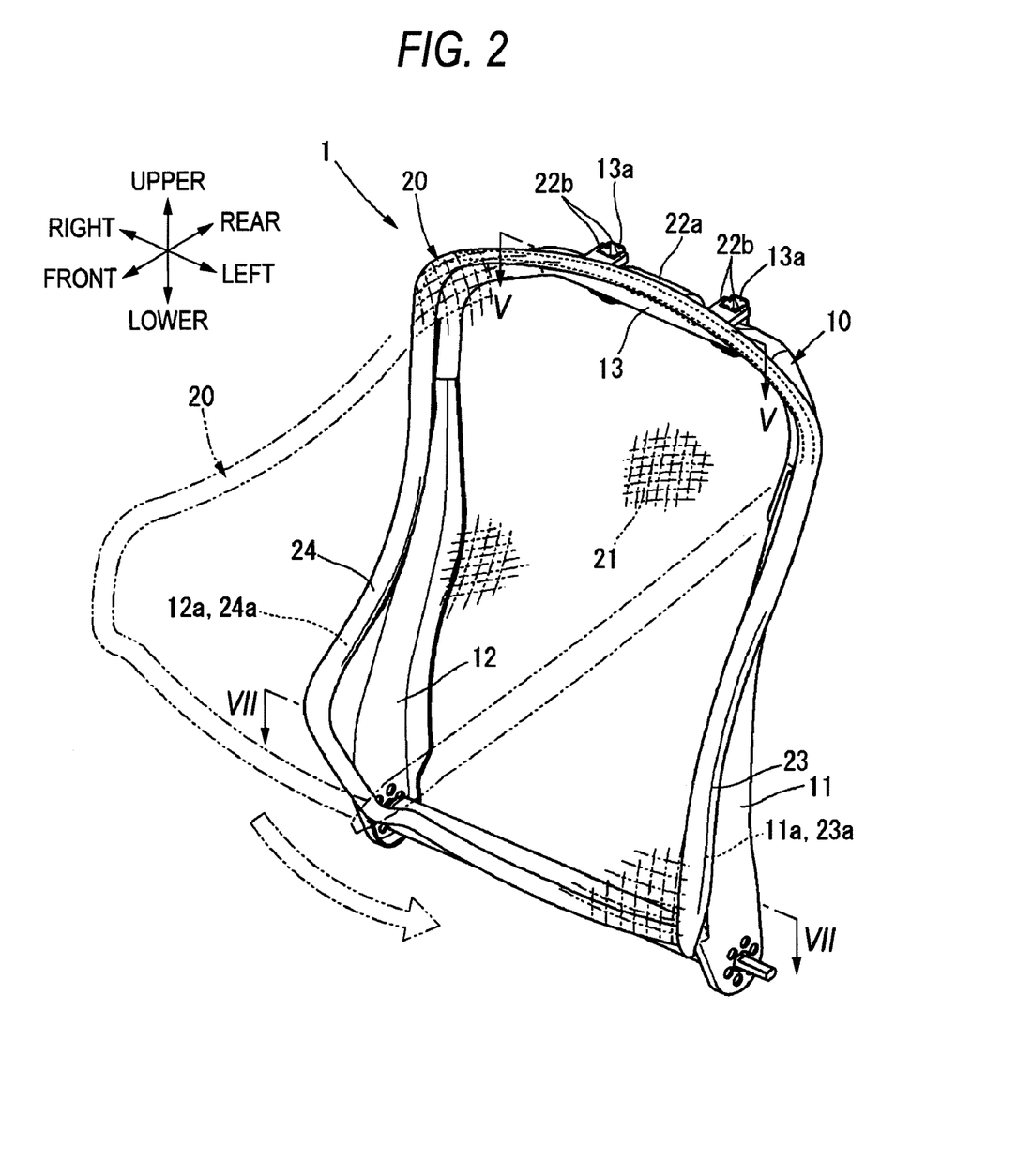
FIG. 2 is a perspective view showing a state in which the assembly frame is assembled in a back frame.

First, the assembly structure of the planar elastic body of the vehicle seat according to first embodiment will be described with reference to FIGS. 1 to 8. The assembly structure of the planar elastic body of vehicle seat according to the present embodiment is configured, as shown in FIGS. 1 and 2, such that a planar net material 21 is detachably assembled to a front surface portion of a seat back 1 constituting a backrest portion of a seat main body of vehicle seat constructed as a so-called net seat.

Specifically, the net seat 21 is integrally stretched over the assembly frame 20 of resin material configured such that it can be attached to or detached from a frame shaped back frame 10 which forms a backbone of the seat back 1. Here, the net material 21 corresponds to a planar elastic body of the invention and the back frame 10 corresponds to the backbone frame of the invention. The assembly frame 20 is formed in a substantially quadrilateral frame shape conforming to the frame shape of the back frame 10 and is adapted to be detachably assembled to the front surface portion of the back frame 10. The net material 21 is stretched over the assembly frame 20 to cover the front surface portion of the assembly frame 20.

Figure 7:
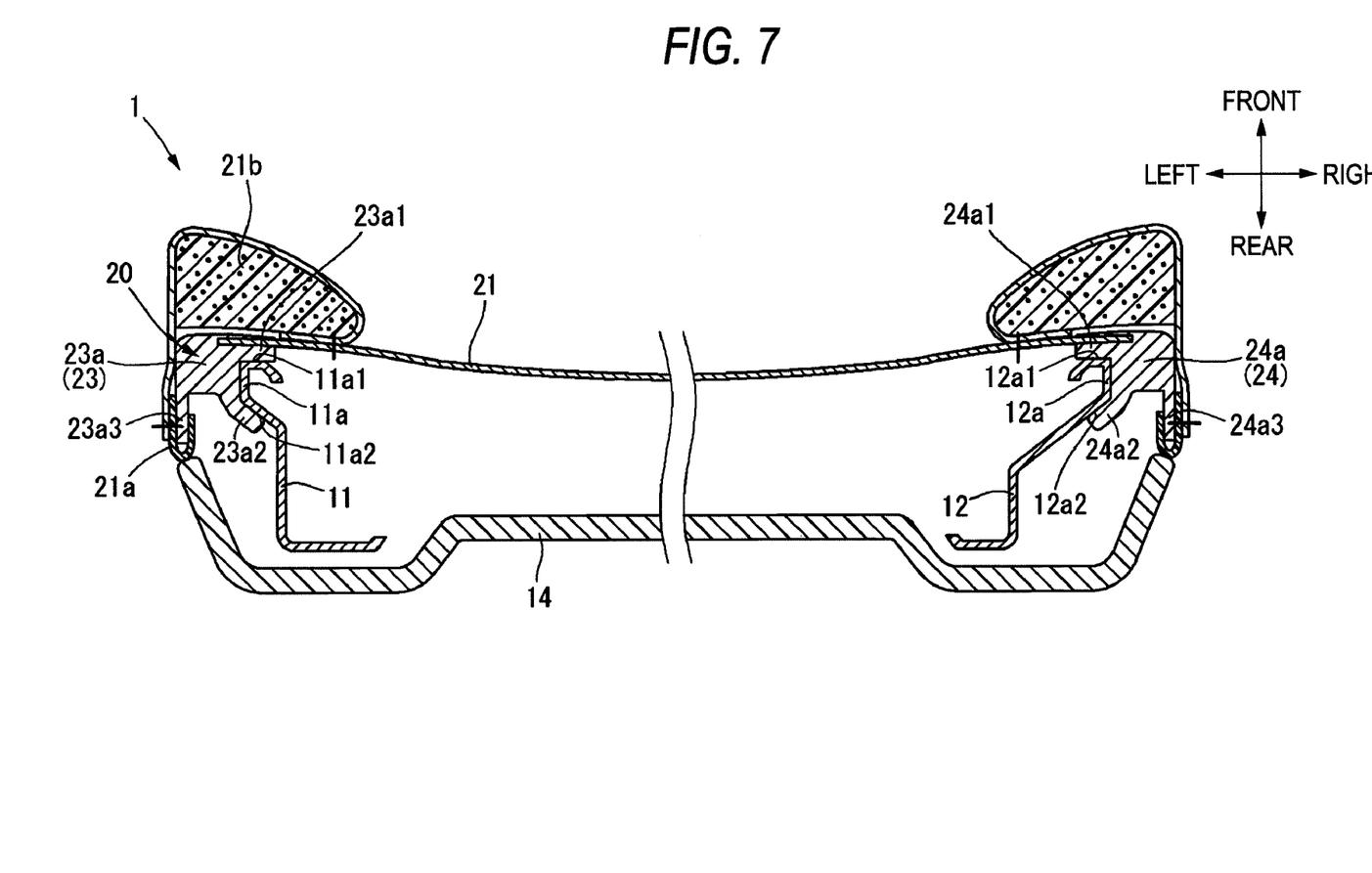
FIG. 7 is a sectional view taken along line VII-VII in FIG. 2.

Further, as shown in FIG. 7, a back board 14 of resin material is provided at a rear surface portion of the back frame 10 to cover entire rear surface and be fixed thereto. Here, the net material 21 is configured such that a supporting surface which supports the back of the seated occupant is formed by one sheet of face material and an outer peripheral edge portion of the face material extends towards the assembly frame 20 and is embedded into the assembly frame 20 and fixed thereto. On both of the right and left side portions of the net material 21, pads 21b and 21b for side supporting the back of the seated occupant are provided to serve as a cushion.

Next, to the both of the right and left side portions of the face material, the face materials are again joined by suturing. These right and left sutured face materials are turned around the both outside of the assembly frame 20 to wrap around the pad 21b and 21b, and fixed in such a manner where the hook 21a and 21a, which are sutured to the outer peripheral edge portion, are pulled toward the grip portions 23a3 and 24a3 formed in a protruding manner at rear surface portions of the right and left transverse frame portions 23 and 24 of the assembly frame 20 and are hooked on them.

Figure 6:
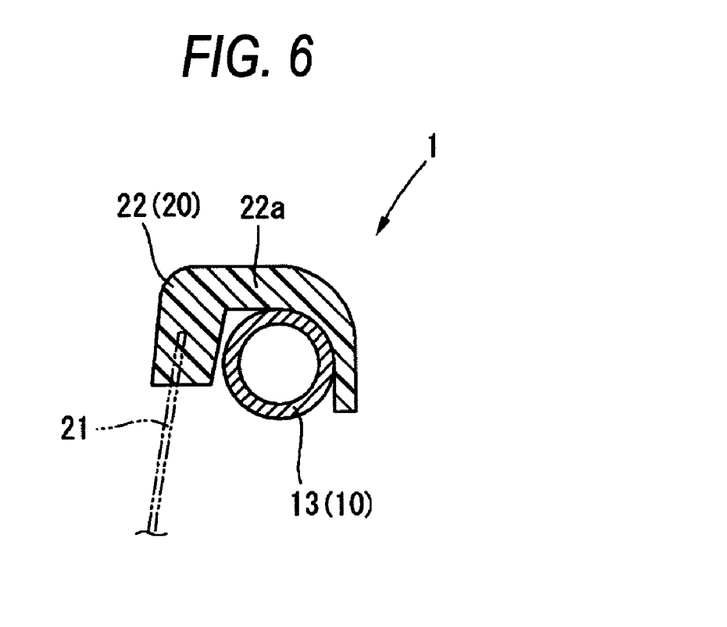
FIG. 6 is a sectional view taken along line VI-VI in FIG. 5.

Incidentally, returning to FIG. 1, the assembly frame 20 is configured to be assembled to the back frame 10 in a state where an upper frame portion 22 of the assembly frame 20 contacts with an upper frame 13 of round pipe which is an upper frame portion of the back frame 10 and the right and left transverse frame portions 23 and 24 contact with the right and left side frames 11 and 12 of the back frame 10 respectively. Specifically, as shown in FIG. 6, the upper frame portion 22 of the assembly frame 20 is assembled in a state where it contacts with a front face, an upper face and a rear face of the upper frame 13, respectively.

As shown in FIG. 7, the right and left transverse frame portions 23 and 24 of the assembly frame 20 are configured to be assembled in a state where they contact with the front faces 11a1 and 12a1, the outer side faces and the rear faces 11a2 and 12a2 of the extension portions 11a and 12a formed at front ends of each of the side frames 11 and 12. Accordingly, the assembly frame 20 is configured to be assembled to the back frame 10 in a state where, due to its frame shape, it surrounds the frame shape of the back frame 10 from outside and pinches it from the front and rear sides.

Here, at an upper frame portion 22 of the assembly frame 20, a hook 22a which is hooked on the upper frame 13 in a gravitational direction from an upward side and the U-shaped receiving portions 22b and 22b which can receive the square tube shaped holders 13a and 13a fixed to the upper frame 13 respectively when the hook 22a is hooked are formed respectively (see FIGS. 3 to 6).

Figure 3:
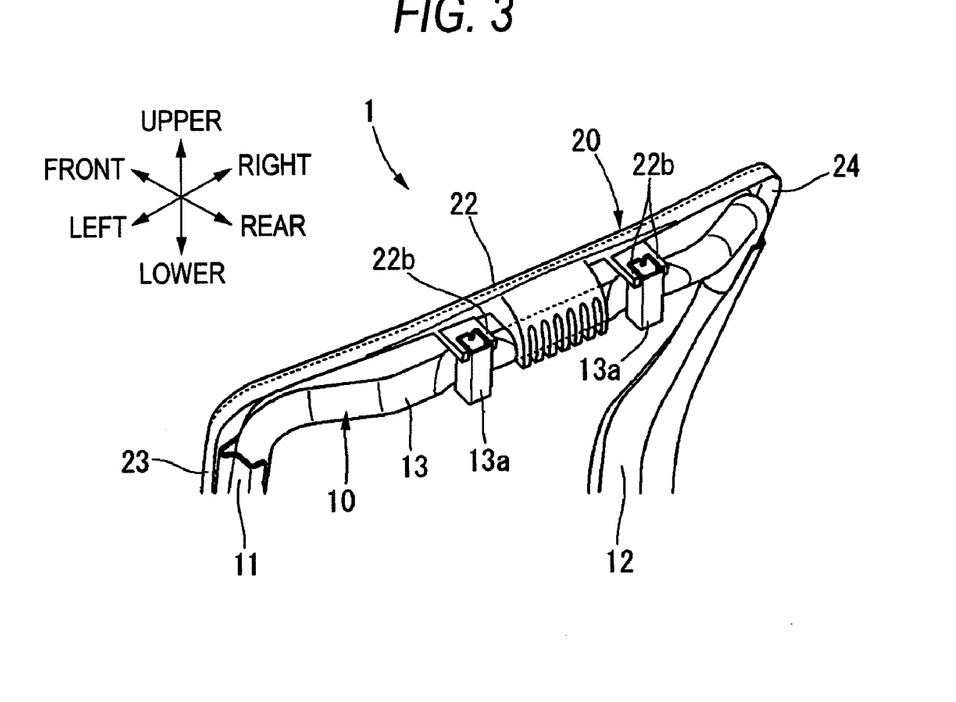
FIG. 3 is a perspective view showing a state in which the assembly frame is hooked on an upper frame, seen from a rear side.

Here, each of the holders 13a and 13a is configured to serve as a supporting tool to insert a stay for mounting a head rest (not shown) over the seat back 1. As shown in FIGS. 3 and 6, the hook 22a is configured to be hooked in a gravitational direction with respect to the upper frame 13 and thus be assembled in a state of pinching the upper frame 13 between it and the upper frame portion 22 of the assembly frame 20 from front and rear sides. Accordingly, due to the hooking of the hook 22a, the upper frame portion 22 is assembled to the upper frame 13 in a state of being prevented from escaping in a front and rear side direction (in an out-of-plane direction of the net material 21).

Figure 4:
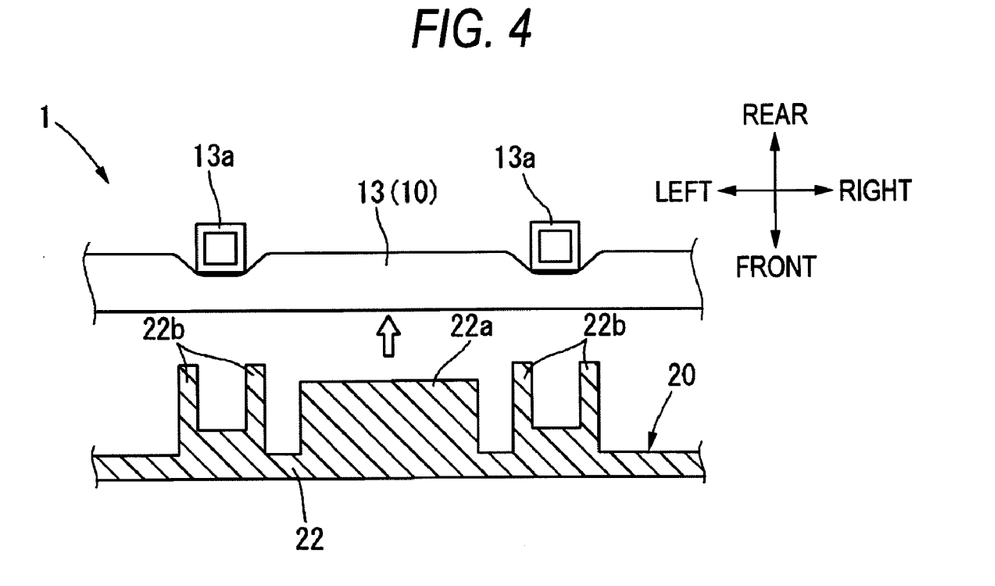
FIG. 4 is a sectional view taken along line IV-IV in FIG. 1.
Figure 5:
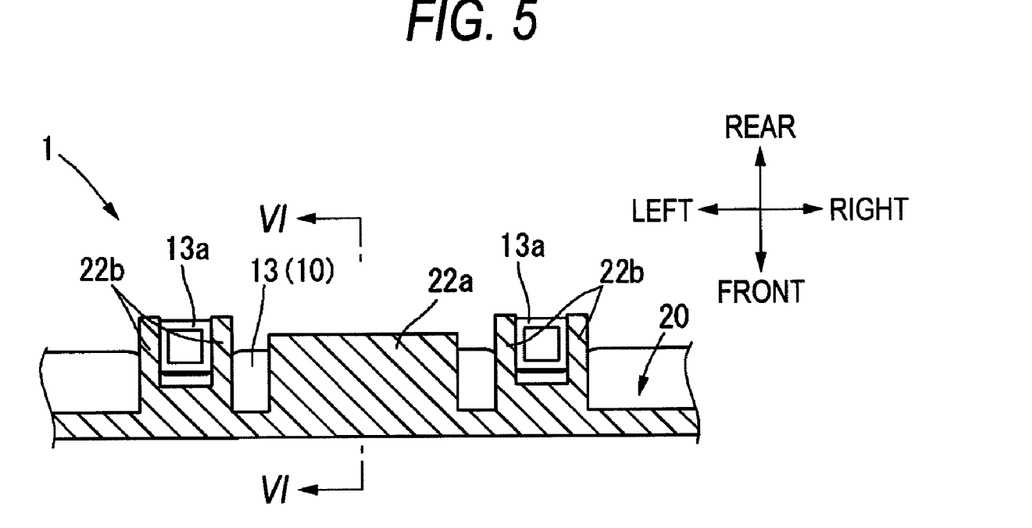
FIG. 5 is a sectional view taken along line V-V in FIG. 2.

In addition, as shown in FIGS. 4 and 5, each of the receiving portions 22b and 22b positions the hook 22a in a transverse width direction (in a right and left direction) when the hook 22a is hooked on the upper frame 13 so as to receive each of the holders 13a and 13a in the U-shape of each of the receiving portions 22b and 22b. With this configuration, each of the holders 13a and 13a comes to a state of being pinched in a transverse width direction (in a right and left direction) by each of the receiving portions 22b and 22b, which results in a state where movement of the assembly frame 20 to the upper frame 13 in a transverse width direction is restricted. That is, it causes a state in which an assembling position of the assembly frame 20 to the back frame 10 in a transverse width direction is positioned.

Figure 8:
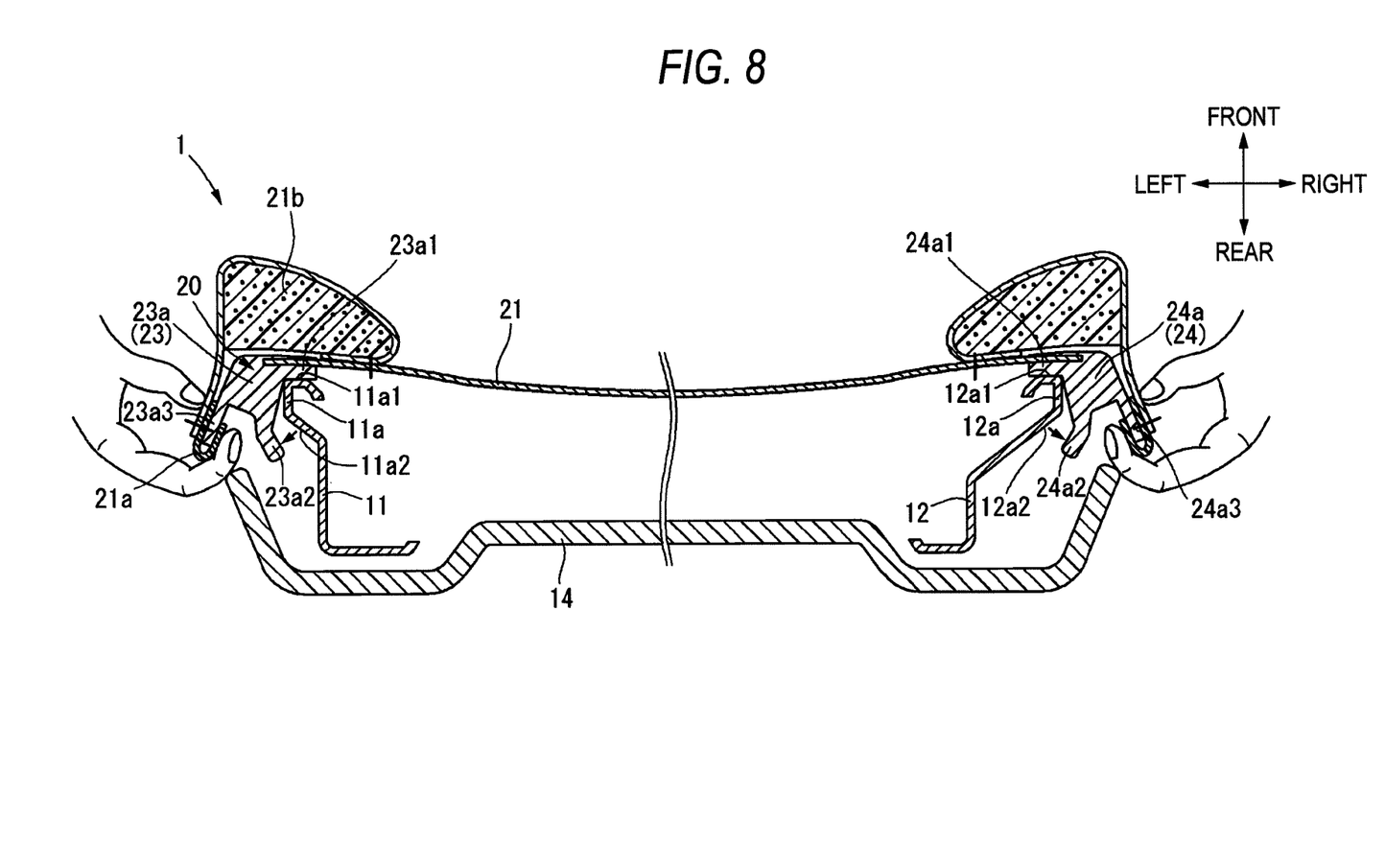
FIG. 8 is a sectional view showing a state in which the assembly frame is out of the state of being latched with the back frame.

In addition, returning to FIG. 1, the right and left transverse frame portions 23 and 24 of the assembly frame 20 are provided with the latching portions 23a and 24a which are elastically latched to outside faces of the right and left side frames 11 and 12 of the back frame 10 and can hold the assembly frame 20 in a state of being attached to the back frame 10. These latching portions 23a and 24a are configured to be elastically latched to the extension portions 11a and 12a formed in the front end of each of the side frames 11 and 12 so as to pinch the extension portions from both outsides, as shown in FIGS. 7 and 8.

Specifically, each of the side frames 11 and 12 is configured such that the front ends thereof extend respectively outwards in a transverse width direction to form the extensions 11a and 12a. These extensions 11a and 12a are configured such that each of the side frames 11 and 12 is respectively formed by bending, these front faces 11a1 and 12a1 are formed to face the front side, and these rear faces 11a2 and 12a2 are formed to face outward with a slope.

In addition, each of the latching portions 23a and 24a is configured to include a seating surface portions 23a1 and 24a1 which contact with the front faces 11a1 and 12a1 of the extension portions 11a and 12a of the side frames 11 and 12, the claw portions 23a2 and 24a2 which contact with the rear faces 11a2 and 12a2 of the extension portions 11a and 12a, and the grip portions 23a3 and 24a3 which are the operating portions when latching or unlatching each of the latching portions 23a and 24a with respect to each of the extensions 11a and 12a.

As shown in FIG. 7, each of the latching portions 23a and 24a is configured such that when the latching portions are in a free state, it is possible to hold the front faces 11a1 and 12a1 and the rear faces 11a2 and 12a2 of the extensions 11a and 12a of the side frames 11 and 12 in an elastically pinched state (latched state) by the seating surface portions 23a1 and 24a1 and the claw portions 23a2 and 24a2 of the latching portions. As the latching portions 23a and 24a are latched, each of the side frames 11 and 12 comes to a state of being pinched by each of the latching portions 23a and 24a from both outsides, and the assembly frame 20 is held in a state of being elastically latched to the back frame 10.

Such a latching causes a state in which the assembly frame 20 is attached to the back frame 10, and the upper frame portion 22 and the transverse frame portions 23 and 24 of the assembly frame 20 contact with the upper frame 13 of the back frame 10 and the front faces 11a1 and 12a1 of the side frames 11 and 12. Accordingly, in this state, even if a backrest load of the seated occupant is applied to the net material 21, such a load can be stably supported since the assembly frame 20 is supported by the back frame 10 of high rigidity and strength from inside and rear side of the frame.

The latching portions 23a and 24a having the above described constitution are, as shown in FIG. 8, bent with twist so as to be separated to both outsides from a state in which each of the claw portions 23a2 and 24a2 contacts with the rear faces 11a2 and 12a2 of the extensions 11a and 12a by an operation in which an operator hooks his hands into the grip portions 23a3 and 24a3 of the latching portions 23a and 24a, presses the outside faces of the latching portions 23a and 24a as a fulcrum point by thumb and bends each of the grip portions 23a3 and 24a3 to both outsides. Thus, since each of the latching portions 23a and 24a is released from a state of being latched to each of the extensions 11a and 12a, each of the transverse frame portions 23 and 24 of the assembly frame 20 can be separated to the front side of each of the side frames 11 and 12 by an operation in which each of the latching portions 23a and 24a is pulled to near side (front side) as it is in a twisted-bent state.

Further, in a case in which each of the latching portions 23a and 24a is latched to each of the extensions 11a and 12a, in an order reverse to the above described order, in a state in which each of the latching portions 23a and 24a is previously bent outwards with twist, an operation to press each of the transverse frame portions 23 and 24 onto the front faces 11a1 and 12a1 of each of the side frames 11 and 12 is performed. This causes a state in which the seating surface portions 23a1 and 24a1 of each of the latching portions 23a and 24a contact with the front faces 11a1 and 12a1 of each of the side frames 11 and 12. Accordingly, in this state, by releasing the twisted-bent state of each of the latching portions 23a and 24a, the claw portions 23a2 and 24a2 of each of the latching portions 23a and 24a return from a twisted-bent state by their elastic restoring force to contact with the rear faces 11a2 and 12a2 of each of the extensions 11a and 12a, and thus each of the latching portions 23a and 24a comes to be elastically latched to each of the extensions 11a and 12a.

Subsequently, returning to FIG. 1, a method of assembling the assembly frame 20 to the back frame 10 will be described. That is, firstly, an operator grips both of the transverse frame portions 23 and 24 of the assembly frame 20, and then hooks the hook 22a formed at the upper frame portion 22 on the upper frame 13 of the back frame 10 in a manner of falling down from the above (see FIG. 6). At this time, after performing a positioning in a transverse width direction so that each of the receiving portions 22b and 22b formed at the upper frame portion 22 receives therein each of the holders 13a and 13a provided at the upper frame 13, the hook 22a is hooked on the upper frame 13.

Thus, the assembly frame 20 comes to a state in which its movement in a transverse width direction with respect to the upper frame 13 is restricted, and a state in which it can rotate in a pendulum movement about the upper frame 13, as a base axis, formed of round pipe on which the hook 22a has been hooked. Accordingly, from this state, by rotating the assembly frame 20 as it is in a gravitational direction to fall down like a pendulum movement, as shown in FIG. 2, the frame shape of the assembly frame 20 can be moved to be overlapped with the frame shape of the back frame 10.

Thereafter, each of the latching portions 23a and 24a is bent with twist outwards by hands gripping each of the transverse frame portions 23 and 24, thereby each of the transverse frame portions 23 and 24 contacts with the front faces 11a1 and 12a1 of each of the side frames 11 and 12. Then, a twisted-bent state of each of the latching portions 23a and 24a is released. Thus, each of the latching portions 23a and 24a comes to a state of being elastically latched to each of the extensions 11a and 12a and the assembly frame 20 is attached to the back frame 10. Next, a method of releasing the assembly frame 20 from the state of being attached to the back frame 10 will be described.

That is, firstly, as shown in FIG. 8, as an operator inserts its hands into the grip portions 23a3 and 24a3 of each of the latching portions 23a and 24a and bends each of the latching portions 23a and 24a towards both outsides with twist, a state in which each of the latching portions 23a and 24a is latched to each of the extensions 11a and 12a is released. From this state, by pulling each of the latching portions 23a and 24a as it is in a twisted-bent state to near side (front side), each of the transverse portions 23 and 24 of the assembly frame 20 is separated towards a front side of each of the side frames 11 and 12.

From this state, the hook 22a is removed from the upper frame 13 by raising the assembly frame 20 upward, thereby the assembly frame 20 can be completely separated from the back frame 10. In this way, by constructing a detachable type unit in which the net material 21 is stretched over the assembly frame 20 and integrated with the assembly frame 20, in a case in which the net material 10 is contaminated, it is possible to easily detach the net material 21 from the back frame 10 and then simply attach the net material 21 to the back frame 10 again. In addition, even when the net material 21 is to be exchanged with the textile which conforms to a cold or hot climate or a net material of a preferred color, it is possible to perform such an exchange operation simply.

In this way, with the assembling structure of the planar elastic body of the vehicle seat according to the present embodiment, it is possible to secure the assembling strength of the assembly frame 20 to the back frame 10 by hooking the hook 22a and simply attach or detach the assembly frame 20 with respect to the back frame 10 by a configuration combining a structure in which the hook 22a formed at the upper frame portion 22 of the assembly frame 20 is hooked on the upper frame 13 and prevented from escaping, with a structure in which the latching portions 23a and 24a formed on both of the transverse frame portions 23 and 24 of the assembly frame 20 are elastically latched to the extensions 11a and 12a formed on both of the side frames 11 and 12 of the back frame 10.

In addition, when the hook 22a is hooked on the upper frame 13, it is possible to perform a positioning of an assembling position of the assembly frame 20 to the back frame 10 in a transverse width direction by receiving the holders 13a and 13a of the back frame 10 in each of the receiving portions 22b and 22b. Thus, by restricting the moving direction of assembly of the assembly frame 20 to the back frame 10 to one direction (a falling down direction), it is possible to perform simply a positioning operation to overlap the frame shape of the assembly frame 20 with the frame shape of the back frame 10.

In addition, by hooking the hook 22a on the upper frame 13 in a gravitational direction and rotating the assembly frame 20 as it is in a gravitational direction to fall down like a pendulum movement, it is possible to move the frame shape of the assembly frame 20 in a direction to be overlapped with the frame shape of the back frame 10. In this way, by a unidirectional operation in which the assembly frame 20 falls down in a gravitational direction, it is possible to simply perform a positioning operation in which the frame shape of the assembly frame 20 is overlapped with the frame shape of the back frame 10. Accordingly, it is possible to more simply perform the attaching operation of the assembly frame 20 with respect to the back frame 10.

In addition, in a configuration according to the present embodiment, without changing either hand gripping both of the transverse frame portions 23 and 24 of the assembly frame 20, it is possible to perform an operation in which the hook 22a is hooked on the upper frame 13 and an operation in which both of the transverse frame portions 23 and 24 of the assembly frame 20 are latched to both of the side frames 11 and 12 of the back frame 10, and it is possible to simply perform such operations. Further, similarly, without changing either hand gripping both of the transverse frame portions 23 and 24 of the assembly frame 20, it is possible to perform an operation in which both of the transverse frame portions 23 and 24 of the assembly frame 20 are released from a state of being latched to both of the side frames 11 and 12 of the back frame 10 and an operation in which the hook 22a is removed from the upper frame 13, and it is possible to simply perform such operations.

Although one embodiment of the invention is described in the foregoing, the invention can be implemented as various embodiments other than the above described embodiment. For example, the attaching and/or detaching structure of the net material 21 according to the present invention can be applied to various locations of the seat main body which supports the body of the seated occupant such as a seat cushion or a head rest other than the seat back 1 described in the above embodiment.

In addition, the hook 22a constituting a hook portion of the assembly frame according to the invention may be hooked on any of the frame portions (the portions to be hooked) constituting the backbone frame or any of the frame portions of the assembly frame. Further, a configuration in that the hook is formed at a backbone frame side and the hook is hooked on the frame portion of the assembly frame side may be adopted. However, the frame portion on which the hook is hooked is preferably formed in a shape which causes the assembly frame to be easily rotated in a direction of being matched with the backbone frame in a frame shape, for example, a round pipe shape, while allowing the hooking portion of the hook to function as a base axis, in a state in which the hook is hooked.

In addition, a hook structure in which the hook portion of the assembly frame is hooked on the portion to be hooked of the backbone frame is not limited to the hook structure of the hook as described above, and various structures may be applied. For example, a configuration in which a slide rail structure is used as the hook structure of the hook portion and the portion to be hooked and the assembly frame is adapted to be slid longitudinally or transversely with respect to the backbone frame to be guided in a direction for matching the frame shapes may be adopted.

In addition, although a configuration in which elasticity of the resin-molded assembly frame 20 is used as an elastic latching unit of the invention and the latching portions 23a and 24a formed at the both of the transverse frame portions 23 and 24 of the assembly frame 20 are latched to the extensions 11a and 12a formed at each of the side frames 11 and 12 of the back frame 10 to pinch the extensions from both outsides is illustrated, a configuration in which a latching tool such as a resin clip or the like is set in the assembly frame 20 or the back frame 10 and the assembly frame 20 is pressed onto the back frame 10 to elastically latch the frames to each other may be adopted.

As described above, according to a first aspect of the present invention, there is provided an assembling structure for a vehicle seat, comprising: an assembly frame that has a frame shape and configured to be detachably attached to a seat main body of the vehicle seat, the seat main body having a backbone frame that has a frame shape; a planar elastic body that is configured to elastically support a body of an occupant and is stretched on the assembly frame; an elastic latching unit that is configured to be detachably attached to a part of the backbone frame such that the assembly frame is detachably attached to the seat main body, the elastic latching unit formed on a part of a periphery of the assembly frame, wherein the assembly frame further includes a hook portion, the backbone frame further includes a portion to be hooked, and wherein the planar elastic body is prevented from moving in an out-of-plane direction of the planar elastic body when the hook portion of the assembly frame is hooked on the portion to be hooked of the backbone frame.

With this configuration, the assembly frame is attached to the backbone frame by latching the elastic latching unit formed at a portion between the frame portions between the assembly frame and the backbone frame in a state where the hook portion of the assembly frame is hooked on a portion to be hooked of the backbone frame and prevented from escaping in an out-of-plane direction of the planar elastic body. This attached state of the assembly frame is released by unlatching the elastic latching unit. In this way, due to the configuration combining the structure in which the hook portion is hooked on a portion to be hooked and prevented from escaping and the elastic latching unit, it is possible to secure the strength of assembling the assembly frame to the seat main body by hooking of the hook portion and simply attach/detach the assembly frame to/from the seat main body.

Further, according to a second aspect of the present invention, in addition to the first aspect, an assembling moving direction of the assembly frame with respect to the backbone frame is restricted to one direction by hooking the hook portion of the assembly frame in the portion to be hooked of the backbone frame, and the frame shape of the assembly frame and the frame shape of the backbone frame are positioned to be overlapped by moving the assembly frame in the restricted assembling moving direction.

With this configuration, by hooking the hook portion in the portion to be hooked, the assembling moving direction of the assembly frame with respect to the backbone frame is restricted to one direction. Thus, by an operation which moves the assembly frame in its restricted moving direction, it is possible to simply perform a positioning operation which overlaps the frame shape of the assembly frame and the frame shape of the backbone frame.

Further, according to a third aspect of the present invention, in addition to the second aspect, the backbone frame further includes a protruding portion, the assembly frame further includes a receiving unit that is configured to be engaged with the protruding portion, and wherein the hook portion of the assembly frame is configured to be hooked in a gravitational direction on the portion to be hooked of the backbone frame, the hook portion is configured to be restricted in its movement in a transverse width direction with respect to the backbone frame by being engaged with the protruding portion and the receiving unit when the hook portion is hooked on the portion to be hooked of the backbone frame, and the frame shape of the assembly frame and the frame shape of the backbone frame are positioned to be overlapped by rotating the assembly frame in a pendulum movement with making the portion to be hooked of the backbone frame on which the hook portion has been hooked as a rotation axis.

With this configuration, the assembly frame can move in a direction in which the frame shape of the assembly frame is overlapped with the frame shape of the backbone frame by hooking the hook portion formed as a hook in the frame portion (the portion to be hooked) of the backbone frame and rotating the assembly frame in a pendulum movement with making the hooked frame portion as a rotation axis. In this way, by a unidirectional operation which hooks the hook formed in the assembly frame in a gravitational direction, it is possible to simply perform a positioning operation which overlaps the frame shape of the assembly frame with the frame shape of the backbone frame. Accordingly, it is possible to perform an attaching operation of the assembly frame to the backbone frame more simply.

Further, according to a fourth aspect of the present invention, in addition to the third aspect, the protruding portion of the backbone frame has a opening in which a part of a head rest of the vehicle seat is inserted.

Further, according to a fifth aspect of the present invention, in addition to the first aspect, a plurality of the elastic latching unit are provided on the periphery of the assembly frame.

Further, according to a sixth aspect of the present invention, there is provided a vehicle seat, comprising: a seat main body that has a backbone frame having a frame shape; an assembly frame that has a frame shape and configured to be detachably attached to the backbone frame of the seat main body; a planar elastic body that is configured to elastically support a body of an occupant and is stretched on the assembly frame; an elastic latching unit that is formed on a part of a periphery of the assembly frame, the elastic latching unit configured to be detachably attached to a part of the backbone frame such that the assembly frame is detachably attached to the seat main body, wherein the assembly frame further includes a hook portion, the backbone frame further includes a portion to be hooked, and wherein the planar elastic body is prevented from moving in an out-of-plane direction of the planar elastic body when the hook portion of the assembly frame is hooked on the portion to be hooked of the backbone frame.

What is claimed is:

1. An assembling structure for a vehicle seat, comprising:
an assembly frame that has a frame shape and configured to be detachably attached to a seat main body of the vehicle seat, the seat main body having a backbone frame that has a frame shape;
a planar elastic body that is configured to elastically support a body of an occupant and is stretched on the assembly frame;
an elastic latching unit that is configured to be detachably attached to a part of the backbone frame such that the assembly frame is detachably attached to the seat main body, the elastic latching unit formed on a part of a periphery of the assembly frame,
wherein
the assembly frame further includes a hook portion,
the backbone frame further includes a portion to be hooked,
and wherein
the planar elastic body is prevented from moving in an out-of-plane direction of the planar elastic body when the hook portion of the assembly frame is hooked on the portion to be hooked of the backbone frame.

2. The assembling structure according to claim 1, wherein
an assembling moving direction of the assembly frame with respect to the backbone frame is restricted to one direction by hooking the hook portion of the assembly frame in the portion to be hooked of the backbone frame, and
the frame shape of the assembly frame and the frame shape of the backbone frame are positioned to be overlapped by moving the assembly frame in the restricted assembling moving direction.

3. The assembling structure according to claim 2, wherein
the backbone frame further includes a protruding portion, the assembly frame further includes a receiving unit that is configured to be engaged with the protruding portion, and wherein
the hook portion of the assembly frame is configured to be hooked in a gravitational direction on the portion to be hooked of the backbone frame, the hook portion is configured to be restricted in its movement in a transverse width direction with respect to the backbone frame by being engaged with the protruding portion and the receiving unit when the hook portion is hooked on the portion to be hooked of the backbone frame, and
the frame shape of the assembly frame and the frame shape of the backbone frame are positioned to be overlapped by rotating the assembly frame in a pendulum movement with making the portion to be hooked of the backbone frame on which the hook portion has been hooked as a rotation axis.

4. The assembling structure according to claim 3, wherein
the protruding portion of the backbone frame has a opening in which a part of a head rest of the vehicle seat is inserted.

5. The assembling structure according to claim 1, wherein
a plurality of the elastic latching unit are provided on the periphery of the assembly frame.

6. A vehicle seat, comprising:
a seat main body that has a backbone frame having a frame shape;
an assembly frame that has a frame shape and configured to be detachably attached to the backbone frame of the seat main body;
a planar elastic body that is configured to elastically support a body of an occupant and is stretched on the assembly frame;
an elastic latching unit that is formed on a part of a periphery of the assembly frame, the elastic latching unit configured to be detachably attached to a part of the backbone frame such that the assembly frame is detachably attached to the seat main body,
wherein
the assembly frame further includes a hook portion,
the backbone frame further includes a portion to be hooked,
and wherein
the planar elastic body is prevented from moving in an out-of-plane direction of the planar elastic body when the hook portion of the assembly frame is hooked on the portion to be hooked of the backbone frame.

* * * * *